INVENTORS
William L. Helmbrecht,
BY Robert H. Welker and
Arthur E. Krieger
Nobbe & Swope
ATTORNEYS

Fig. 6.

INVENTORS
William L. Helmbrecht,
Robert H. Welker and
BY Arthur E. Krieger
Nobbe & Swope
ATTORNEYS

INVENTORS
William L. Helmbrecht,
Robert H. Welker and
BY Arthur E. Krieger
Nobbe & Swope
ATTORNEYS 3,311,233
APPARATUS FOR GLASS INSPECTION AND
SORTING HAVING CONTOUR SENSING
MEANS
William L. Helmbrecht, Toledo, Robert H. Welker, Perrysburg, and Arthur E. Krieger, Toledo, Ohio, assignors to Libbey-Owens-Ford Glass Company, Toledo, Ohio, a corporation of Ohio
Filed Aug. 19, 1964, Ser. No. 390,519
11 Claims. (Cl. 209—73)

The present invention relates broadly to the inspection of sheet material and more particularly to an improved apparatus for determining quickly and automatically whether particular articles, such as flat or bent glass sheets, are dimensionally within prescribed tolerances.

Prior to this invention, in the inspection of bent glass sheets for example, it has been customary to employ a gauging or checking member. Such members are usually cast from metal or plaster with a form surface conforming to the bent contour desired in the glass sheets. A curved or bent sheet to be inspected is placed upon the form surface of the checking member and if the surface of the glass sheet and the form surface of the checking member are in agreement the sheet is acceptable. However, whenever the bent sheet is found to be "off-form," it becomes necessary to insert feeler gauges at intervals between the marginal edge portions of the sheet and the surface of the checking member to determine whether the amount of clearance therebetween is within allowable tolerances. This is a slow and tedious procedure, subject to errors in judgment, and requires the keeping of handwritten records of the checking results.

On the other hand, with the apparatus of this invention, the conformity of a flat or bent sheet of glass to the form surfaces of an inspection or checking fixture can be quickly determined and, at the same time, the degree of "off-form" of any sheet not in conformity with the surfaces of the checking member will be automatically indicated and recorded.

It is therefore a primary object of the invention to provide an improved apparatus for inspecting sheet materials to determine the conformity or degree of nonconformity of a sheet to an established contour or flatness.

Another object of the invention is to provide an improved apparatus for inspecting sheet materials by positioning a sheet between complementary contoured surfaces and automatically indicating and recording the conformity of the sheet with such surfaces or magnitude of deviation in the sheet from the contoured surfaces.

Another object of the invention is to provide inspection apparatus in which bent glass sheets are successively carried along a path of movement into an inspection area and then selectively separated and sorted according to their conformity to or deviation from the prescribed curvature of a checking member.

A still further object of the invention is to provide, in inspection apparatus of the above character, automatically operable control means adapted to regulate distances between successive bent glass sheets moving into the apparatus, to cause the performance of an inspection operation in response to the position of each successive sheet and to then sort the bent sheets according to the result of such inspection operation.

Other objects and advantages of the invention will become more apparent during the course of the following description when read in connection with the accompanying drawings.

In the drawings, wherein like numerals are employed to designate like parts throughout the same.

Figure 1:
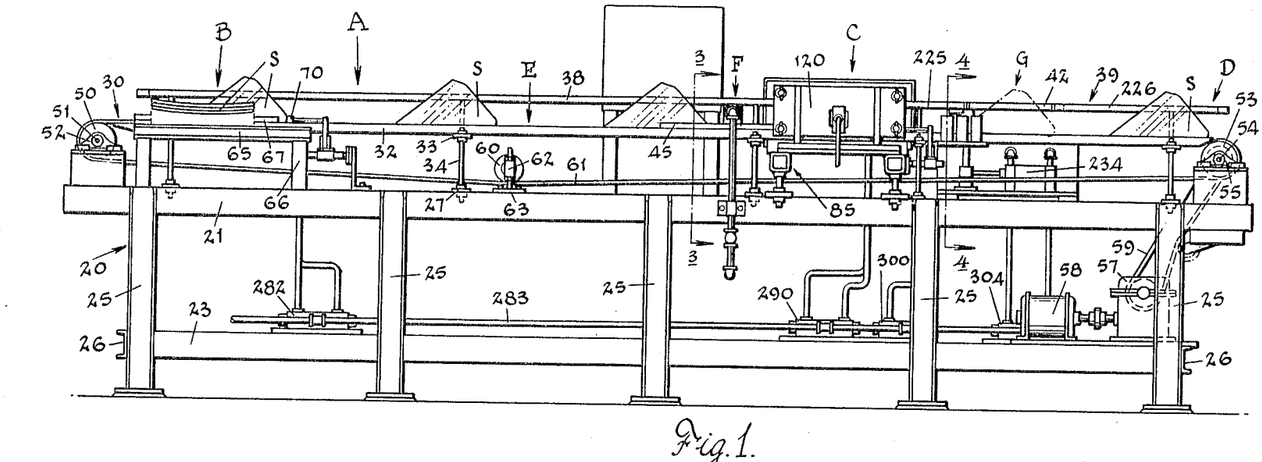
FIG. 1 is a side elevation of an inspection apparatus constructed in accordance with the invention.
Figure 2:
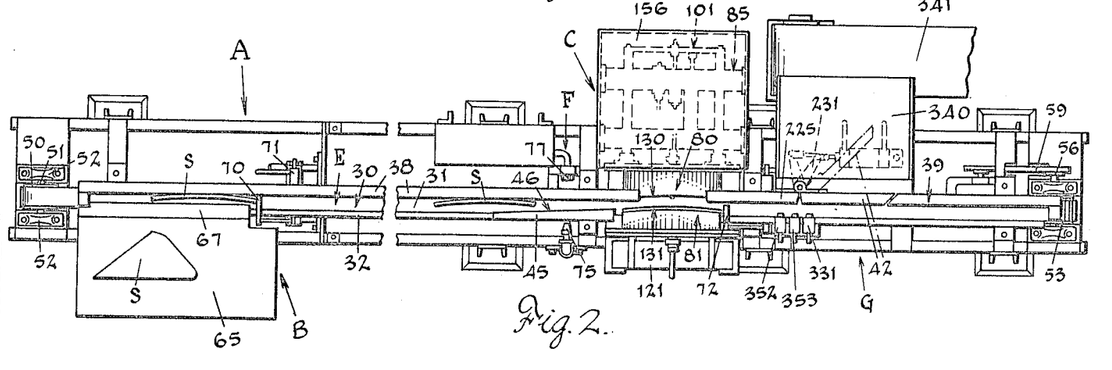
FIG. 2 is a plan view of the inspection apparatus.

Referring now more particularly to the drawings there is shown in FIGS. 1 and 2 an inspection apparatus constructed in accordance with the present invention and designated in its entirety by the letter A. Generally stated, this inspection apparatus includes a loading or receiving station, indicated by the letter B; an inspection station indicated by the letter C, and a removing station similarly indicated by the letter D. Incorporated with the apparatus there is an automatic control system, about which more will be said later, and which is adapted to release sheet materials to be inspected, such as bent glass sheets S, in spaced sequences of successive movement from the receiving station B toward the inspection station C and along a horizontal path of movement supplied by a conveyor system E. As each sheet S enters an area closely adjoining the inspection station, it passes between the component elements of a signal device F which is thereby activated, first, to halt the bent glass sheet in the inspection station C, to carry out an inspection of the bent sheet and, third, to then release the same for further movement on the conveyor E toward the removing station D. As each of a plurality of bent sheets is examined in succession, the movement of one sheet from the inspection station causes the release of a subsequent sheet from the receiving station B. The movement of a sheet leaving the inspection station C, however, is determined by the inspection phase of operation. Thus, acceptable bent sheets are moved directly to the removing station D while sheets, which are not acceptable for one reason or another, are ejected from the conveyor E at a discharge station G between stations C and D.

More specifically, the inspection apparatus A includes a structural framework, generally designated by the numeral 20, formed by a longitudinal, horizontally disposed pair of upper side channels 21–22 and a similar pair of lower channels indicated at 23; the pairs of channels being supported by spaced, vertically disposed pedestals 25 suitably braced by transverse channels 26. The upper parallel side-forming channels 21 and 22 are adapted to support the structure of the conveyor system E and to this end are equipped on their upper flanges with tranverse bars 27 substantially equally spaced between the ends of the framework 20.

As herein provided, the conveyor system E includes an endless conveyor belt 30, the upper flight 31 of which is supported on a grooved track 32. This track, which may be and preferably is of wood, is mounted on and above the structural channels by plates 33 on the bottom surface thereof; said plates being arranged in vertically parallel relation to the aforementioned bars 27. Each plate is carried on a respective bar 27 by means of threaded rods 34 and 35, as in FIG. 3, and pairs of nuts 36 and 37. The nuts 37 are located above and below each plate 33 in order that the track 32 can be "leveled" in a horizontal plane between the ends of the apparatus. In upwardly spaced, parallel relation to the track, support bars or rails 38 and 39 are mounted by rods 40, threaded at their lower ends and adjustable relative to the several plates 33 by means of nuts 41.

Figure 3:
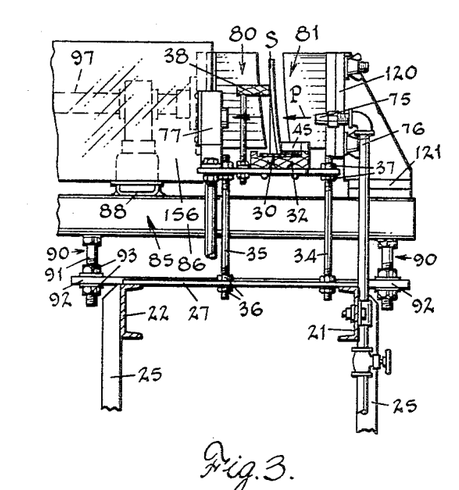
FIG. 3 is a transverse vertical section taken on line 3—3 of FIG. 1.
Figure 4:
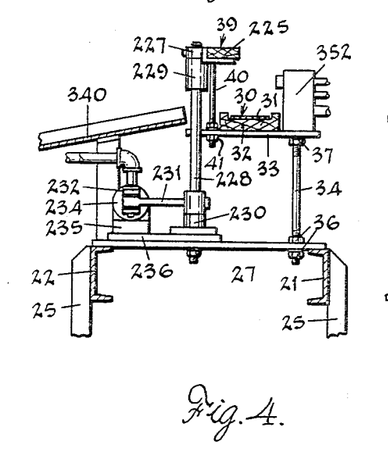
FIG. 4 is a transverse vertical section taken on line 4—4 of FIG. 1.
Figure 5:
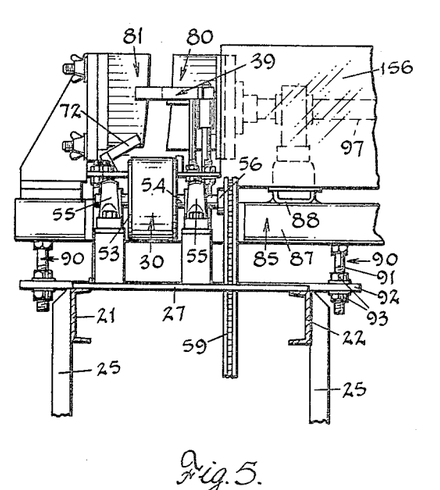
FIG. 5 is an end elevation of the apparatus, as viewed from the right hand of FIG. 1.

As viewed in FIGS. 1 and 2, the support rail 38 will be seen as positioned between the loading or receiving station B and the inspection station C and the support rail 39, aligned with rail 38, as located between the station C and the removing station D. In this connection, it will also be noted that the support rail 39 includes a pivotally mounted bar or gate 42 at the discharge station G, for reasons to be hereinafter more fully explained. With reference to FIGS. 2, 3 and 4, it will be apparent that the rails 38 and 39 are supported above the rear margin of the track 32 to suitably support glass sheets S in a substantially vertical plane while they are successively carried along a forwardly directed path of movement by the upper flight 31 of conveyor belt 30. Also, adjacent the inspection station C, a wedge-shaped plate 45 is located on the track 32 with an angularly disposed edge surface 46 to ensure that the sheets S as they approach station C will be substantially vertically supported against the bar 38.

As viewed in FIG. 1, the conveyor belt 30 is trained at one looped end about an idler pulley 50 having a shaft 51 journaled in bearings 52 mounted on the framework 20 adjacent the receiving station B. Rearwardly of the removing station D, the belt 30 is similarly trained about a pulley 53 having a shaft 54 journaled in bearings 55. In this instance, the pulley 53 serves as the belt driving member and for this purpose one end of the shaft 54 is equipped with a sprocket 56 coupled to a source of power, such as the reduction unit 57 and motor 58, by a sprocket chain 59. The desired tautness in the upper flight 31 of the conveyor belt is adjustably maintained by a pulley 60 acting upon the return flight 61 of the belt and suitably supported by bearings on the rods 62 of a bracket 63 on the channels 21–22.

Figure 14:
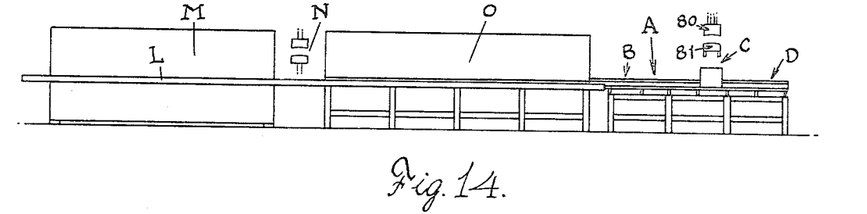
FIG. 14 is a schematic view of one manner of use for the inspection apparatus.

It will be appreciated that this invention can be practiced as a separate and independent checking procedure as illustrated in FIGS. 1 and 2 or as a part of a complete processing and inspection procedure as illustrated in FIG. 14.

In the former case, the framework 20 of the apparatus A of FIG. 1 is equipped, at the receiving station B, with a felt-covered table or platform 65, mounted on the upper side channels 21 and 22 by bracing members 66, for receiving a stack of sheets to be checked.

Along the inner margin of the platform 65, a registry bar 67 is provided to assist in the vertical positioning of a bent sheet as it is removed from the table 65, placed on edge on the conveyor belt 30 and permitted to rest against the support rail 38. Now while the belt 30 is driven continuously, bent sheets, placed on the belt in the receiving station B, are restrained from movement with the belt by means of a stop-bar 70 interposed in their path. The bar 70 is operatively associated with a cylinder 71 and is adapted to be swung upwardly and downwardly in substantially the same manner as similar swinging movements of a stop member or bar 72 arranged at the exit end of the inspection station C, as will later be described.

As the sheets are successively released from the receiving station B in a spaced relation, as generally shown in FIG. 1, they are carried by the belt 30 into the area of the signal device F and are temporarily interposed between an activator means and a receiver means. As illustrated by way of example in FIG. 3, the signal device F includes an air jet nozzle 75 connected to a source of air under pressure by pipe 76 and adapted to direct a stream of air, indicated by the arrows identified by the letter P, transversely across the path of movement of the sheets and toward an electric switch device 77 that is operably responsive to negative air pressure. Obviously, other instruments, such as photoelectric cells and like receivers, can be employed for the same purpose and to achieve the same end.

Generally speaking, the signal device F is responsive to the interposition of a glass sheet, while the same is being moved forwardly, thereby interrupting the air stream between the nozzle 75 and switch device 77, and is activated to institute a cycle of the inspection operation. Such a cycle includes locating the aforementioned stopbar 72 across and in the path of sheet movement to halt a sheet at the inspection station C, checking the bent contour of the sheet in the station C by means of movable and fixed checking members designated 80 and 81, respectively, and subsequent removal of the stop-bar.

Figure 6:
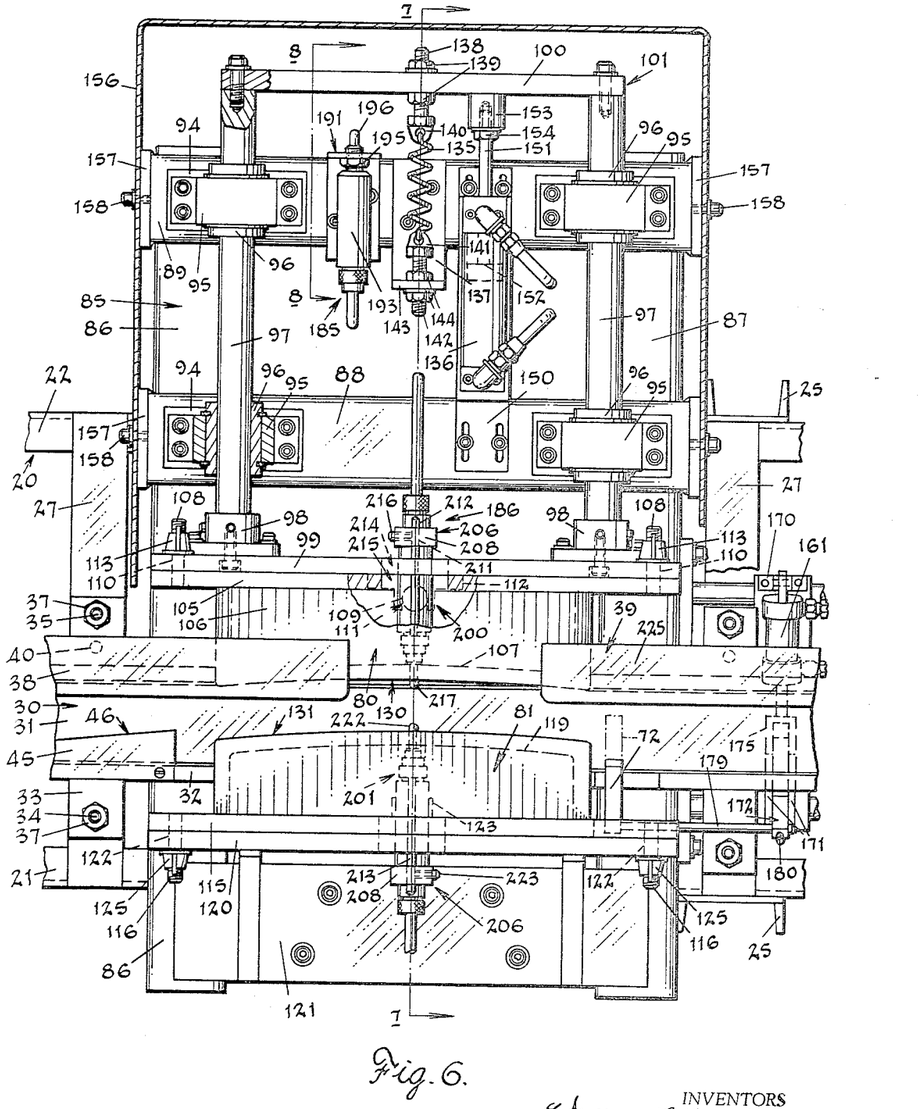
FIG. 6 is an enlarged plan view of the checking members of the apparatus in spaced apart position.
Figure 7:
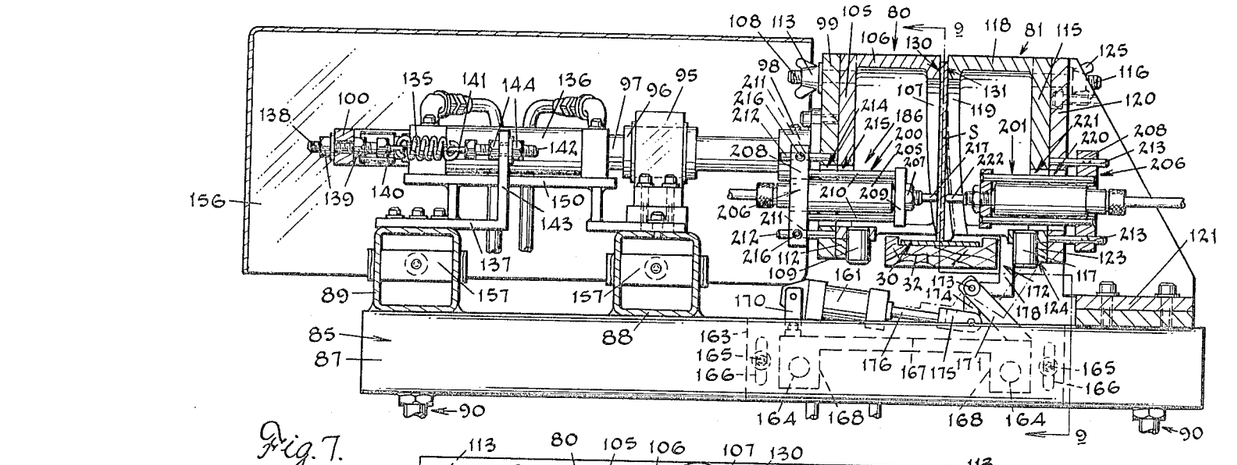
FIG. 7 is a longitudinal vertical section taken on line 7—7 of FIG. 6, with the checking members in substantially closed position.
Figure 9:
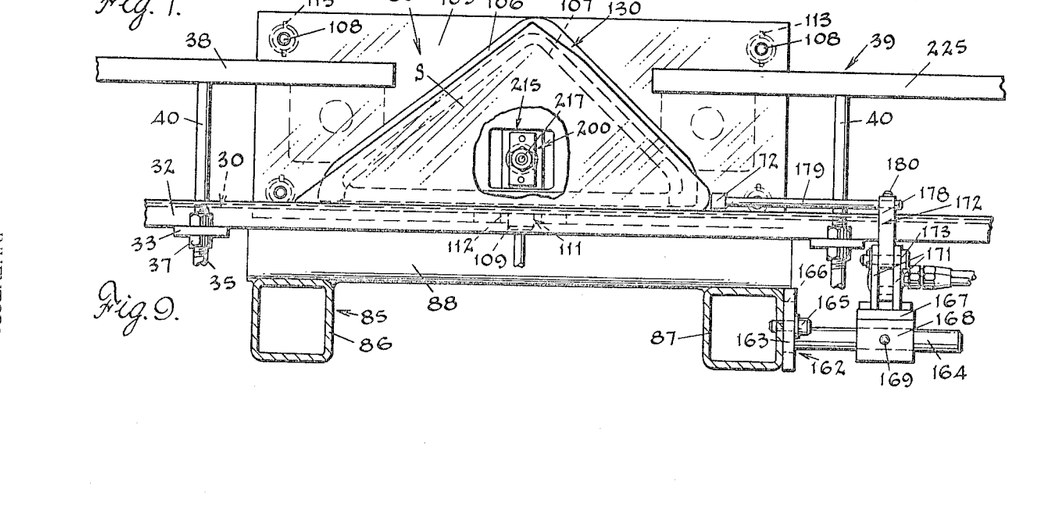
FIG. 9 is a transverse vertical section on stepped line 9—9 of FIG. 7.

With reference now to FIGS. 6, 7 and 9, the gauging elements at the station C are generally supported by a frame 85 comprised of horizontal bars 86 and 87, arranged transversely to the path of sheet movement and the side channels 21 and 22, and bars 88 and 89 affixed to the upper surfaces of bars 86 and 87 in rearwardly spaced, parallel relation to the channel 22. The bars 86 and 87 are equipped on their bottom surfaces with suitably disposed leveling screw devices 90; each having a threaded rod 91 supported in bars 92, affixed to the channels 21 and 22, by adjusting nuts 93. In this way, the frame 85 can be bodily raised or lowered with respect to the elevation of the track 32 and more particularly accurately located in a true horizontal plane.

Each of the frame bars 88 and 89 are provided with blocks 94 for the mounting of bearing brackets 95 in which are received sleeve bearings 96 for the reciprocal movement of horizontally spaced, parallel shafts 97. The shafts 97 constitute the support members for the movable component of the inspection station or the checking member 80. More particularly, one or the respective forward end of each shaft 97 is fixedly received in an adapter bracket 98 secured to a vertically disposed plate 99 while the opposite or rear ends of the shafts are interconnected by a bar 100. The shafts 97, plate 99 and bar 100 thus constitute a carriage 101 on which a checking member can be removably mounted thereby permitting rapid and convenient substitution of checking members according to the outline and curved contour of the bent glass sheets to be inspected.

The movable gauging or checking member 80 is formed by a mounting plate 105 and integral wall 106 projecting in perpendicular relation to one or the outwardly directed surface of the plate. The wall 106, as seen in FIG. 9, has a substantially V-shaped cross-section, parallel to plate 105, which more or less approximates the outline of a bent glass sheet to be inspected by the apparatus, and an outwardly disposed, vertical inwardly directed flange 107. The plate 105 is provided in its corner areas with threaded locator rods 108 and in the medial area of its lower marginal edge with a vertically disposed locator plug 109.

The checking member 80 is mounted on the plate 99 of the carriage 101 by the insertion of rods 108 through locator holes 110 located in the respective corner areas of the plate 99. Positive registration of the rods 108 in the plate 105 of the exemplary checking member 80 can be conventionally ensured by utilizing a standard drill jig when forming the openings for the rods 108 in the plate 105 of one or more movable checking members as well as the holes 110 in the carriage plate 99. Also, as the rods 108 are passed through the respective holes 110, the plug 109 is received in the notch 111 of an alignment bracket 112 carried by the plate 99. By means of wing-nuts 113, or the like, on the extended threaded ends of rods 108, the plate 105 of the checking member 80 is firmly mounted on and carried by the carriage plate 99.

The fixed checking member 81 is formed similarly to the member 80 with a mounting plate 115 equipped in its corner areas with threaded locator rods 116 and a medially disposed locator plug 117. As well, plate 115 has an integral wall 118 projecting perpendicular thereto which is of a cross-section as the wall 106 and likewise is formed with a vertical inwardly directed flange 119. The plate 115 is mounted on and against a support plate 120 that is fixed to a bracket 121 carried by the bars 86 and 87 at their ends above the side channel 21. Similarly, the plate 120 is provided in its corner areas with locator holes 122 and in the medial area of its lower margin with an alignment bracket 123. Thus, in the same manner as the plate 105 of the movable checking member 80, the plate 115 of the fixed checking member 81 is mounted on the plate 120 by insertion of rods 116 through the respective locator holes 122, insertion of the plug 117 in the notch 124 of alignment bracket 123 and the provision of wing-nuts 125 on the threaded ends of the rods 116.

The curved contour of the surfaces of the flange 107 of checking member 80 and the flange 119 of checking member 81 are formed complementary to one another and particularly to the exact bent contour of bent glass sheets to be examined thereby. To illustrate, the flange 107 is formed concave while the flange 119 is oppositely formed convex whereby the opposed surfaces 130 and 131, as in FIG. 6, will conform to the like opposite surfaces of glass sheets bent to a predetermined curvature and having uniform thicknesses. That is to say, when the surface 130 of the movable checking member 80 is brought to a predetermined distance from the surface 131 of the fixed checking member 81, the conformity of a bent glass sheet, interposed therebetween, to the curved formation of such surfaces will be accepted as an indication of conformity of the bent glass sheet to a predetermined standard of curvature. Contrariwise, should the curvature of a bent sheet for any reason prevent movement of the surface 130 of the movable checking member 80 to the aforementioned predetermined distance from the complementary surface 131 of the fixed checking member 81, the non-conformity of the surfaces of the bent sheet to the surfaces of the checking members will indicate that the bent sheet is, for one reason or another, not acceptable or as commonly expressed is "off-form." To prevent inadvertent scratching or otherwise marring of the surfaces of the glass sheet, the surfaces 130 and 131 of flanges 107 and 119 are provided with a layer of suitable non-abrasive coating material having satisfactory properties for long wear.

The complementary curvatures of the surfaces 130 and 131 as shown in FIG. 6 will of course be understood as being representative of only one type of curved contour and it will be appreciated that checking members 80 and 81 can be employed with suitably contoured surfaces to inspect flat glass sheets or sheets bent to any one of a variety of different curvatures. With flat glass sheets the degree of flatness can be determined; parallelism between the surfaces of a sheet can be indicated and, in the event that a sheet is deflected out of a flat plane, the magnitude of such deflection or deviation can be obtained.

As also shown in FIG. 6, the carriage 101 may be reciprocated by cooperative forces such as the coil spring 135 and cylinder 136. The spring 135 is attached at its ends to the bar 100 and to an L-shaped bracket 137 carried by the bar 89 of frame 85. More particularly, a threaded rod 138 is passed through the bar 100 and is axially adjustable by nuts 139; said rod having an apertured head 140 for attachment of a spring end-loop. Similarly, the opposite end-loop of spring 135 is attached to the apertured head 141 of a threaded rod 142 supported in the vertical leg 143 of bracket 137; said rod being equipped with adjusting nuts 144.

The cylinder 136 is mounted by a support bracket 150 on the spaced frame bars 88 and 89. The rod 151 of piston 152 in cylinder 136 is equipped at its outer end with an annular block 153 threaded onto the rod and which is adjustably located by means of a lock-nut 154. As illustrated in FIG. 6, the piston rod 151 is extended to position the carriage 101 and checking member 80 carried thereby in the open position with reference to the opposed fixed checking member 81. On the other hand, as in FIG. 7 and upon reversal of the direction of pressure, about which more will be said later, to the cylinder 136, the spring 135 is permitted to move the carriage 101 forwardly until the surface 130 of member 80 contacts the adjacent surface of a glass sheet and consequently gently urges the opposite surface of the sheet into normally expected contact with the surface 131 of checking member 81.

It has been found preferable to arrange the actuating means for reciprocal movements of the checking member in this way since upon forward movement, the inward direction of the piston rod 151 can be controlled to regulate the contracting properties of the spring 135 while, upon outward motion of the rod 151, a positive force can be applied to overcome the spring and rapidly move the checking member rearwardly to its open position. As well, by employing the known properties of a coil spring as against the positive pressure of a cylinder-actuated rod, the final increments of forward movement can be realized with a desired degree of relatively light compressive force. One reason for this stems from the fact that when a bent glass sheet which deviates from a predetermined curvature is located between the checking members, a positive force applied by the movable member could deflect the sheet from the contour of its finalized curvature to a temporarily further bent condition by which the sheet would thereby be erroneously inspected. Moreover, when the spaced distance between the form surfaces of the checking members indicates that the curvature of the bent sheet is "off-form," there will be no mechanical force, other than the tension of the spring, to bring about any continued forward movement.

To this end, the stroke distance of inward travel of the piston rod 151 and block 153 and during which travel the rate of piston movement controls the contracting action of the spring is predeterminedly established to pull the block from the bar 100 substantially as the movable checking member contacts the surface of a bent sheet. The piston rod thus continues to move inwardly thereby removing the block 153 from engagement with the bar 100 of the carriage 101. On a practical basis by way of illustration, if a predetermined distance of two inches is established between the open position of the checking member 80, as in FIG. 6, and a closed position thereof, as in FIG. 7, the actual distance the member 80 can be moved forward by unrestrained action of the spring 135 might be in the order of 0.040 to 0.060 (forty thousandths to sixty thoustandths). At the same time, however, the stroke distance of the piston rod could be, by way of example, 2¼ inches.

In order to enclose the carriage 101 and the associated elements from undesired accumulation of dirt or otherwise inadvertently incurred damage, a protective housing 156 is provided on the frame 85. For this purpose, plates 157 are provided at the ends of bars 88 and 89 and the side walls of the housing secured to the plates by screws 158.

Preparatory to the above-described forward movement of the movable checking member 80, the bent glass sheet to be inspected is halted in its path of movement by engagement of its leading edge with the stop-bar 72 as viewed in FIGS. 6 and 9. Generally speaking, the stop-bar is movable between the full line and broken line positions by a cylinder 161. More particularly, the stop-bar and cylinder are mounted on a bracket 162 (FIGS. 6, 7 and 9) including a plate 163 provided with spaced, parallel annular support bars 164; said plate being secured to the outwardly directed surface of frame bar 87 by screws 165 passed through slotted openings 166. A platform 167 is carried on the bars 164 by bearing members 168 and is secured to the bars by means of set-screws 169. On its upper surface, the platform 167 is provided at one end with a bracket 170 for pivotally mounting the cylinder 161 while, at the opposite end, spaced legs 171 are formed to support a lever 172 on a pintle 173. One leg 174 of the lever is connected by clevis 175 to the rod 176 of piston 177 in cylinder 161. The outer end of the opposed leg 178 is adapted to carry the stop-bar 72 by a rod 179. Since the plate 163 can be moved vertically relative to the frame bar 87 within the limits of the slots 166 and the platform 167 adjustably located along the bars 164 upon loosening of the set-screws 169, it is believed easily understood that the stop-bar 72 can be located forwardly or rearwardly of its position, as shown in FIGS. 6 and 9, and that similar but more minor adjustments can be quickly made upon loosening of set-screw 180 which secures the rod 179 in the end of lever leg 178. In this way, any desired initial location or subsequent relocation of the stop-bar as to elevation above the track 32 and its distance from the adjacent end area of the wall 118 of the fixed checking member 81 can be readily accomplished. In this connection and preparatory to the inspection of successive glass sheets bent to a predetermined curvature, the stop-bar 72 can be brought into contact with the leading edge of a specimen sheet in the inspection area and then secured as is believed readily understandable.

A duplicate structure is employed for actuating the stop-bar 70 by the cylinder 71 and further description of the similar details is believed unnecessary.

Now, when the movable checking member 80 makes contact with the surface of a bent glass sheet in the checking station C and further movement by the spring 135 is halted, two independently operating gauging devices, designated by the numerals 185 and 186, are simultaneously activated to, first, indicate by the device 185 the spaced distance of the movable checking member 80 from the fixed checking member 81 and the conformity or non-conformity of the curvature of the sheet to the curved contours of the respective gauging or checking surfaces 130 and 131. Secondly, the surfaces of the bent glass sheet are contacted by axially aligned sensing elements of the device 186 to determine the magnitude or deviation of the bent sheet from a predetermined curvature. In other words, the sensing elements mechanically function in the same manner as manually employed "feeler" gauges to determine the magnitude of deviation and thereby indicate whether or not the non-conformity of curvature of the sheet is dimensionally within prescribed tolerances.

Figure 8:
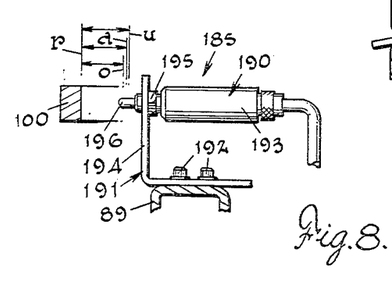
FIG. 8 is a longitudinal vertical section taken on line 8—8 of FIG. 6.

In the first instance, the gauging device 185 includes a linear dimension or displacement transducer unit 190 that is carried by a bracket 191 on the bar 89 of frame 90. As seen in FIGS. 6 and 8, the bracket is secured by screws 192 to the bar 89 while the case 193 of the unit 190 is mounted on the vertically disposed leg 194 of the bracket by lock-nut 195 in parallel relation to the spring 135 and cylinder 136. The transducer unit 190 is provided with an axially movable tip 196 which is adapted to be engaged by the carriage bar 100 and moved inwardly to one or more variable limits in accordance with the spaced distance of the checking member 80 from the checking member 81.

To illustrate, three lines, designated by the letters $o$, $a$ and $u$, are indicated in FIG. 8 in dimensionally spaced relation from a reference line designated by the letter $r$. The line $r$ denotes the location of the inner surface of bar 100 when the checking member 80 is in the rest or open position. The distance line $a$ indicates the normally expected position of the bar 100 when an acceptably bent glass sheet, having a thickness of 0.250″ or ¼″ plate or sheet glass, is between the checking surfaces 130 and 131. The distance line $o$ represents an arbitrarily selected spacing between lines $a$ and $r$ within which spacing the checking surface 130 may be located when in contact with the surface of a bent glass sheet that is found to be "off-form."

Consequently upon completion of the inspection operation, the position to which the tip 196 has been moved by the bar 100 will be translated into an electric force that determines whether the inspected bent sheet will be moved forwardly to the removing station D or be selectively separated from its position on the belt 30 of conveyor E while passing through the discharge station G. The position of tip 196 at reference line $u$ would indicate the inspection of a glass sheet which although possibly bent to the predetermined curvature is objectionably thinner than the aforementioned preferred thickness of one-quarter inch. In this event, the bent glass sheet is thinner than a prescribed tolerance for thickness and therefore may be considered unacceptable.

The gauging device 186 includes oppositely disposed, axially aligned linear displacement transducer units 200 and 201. As best seen in FIGS. 6 and 7, the transducer unit 200 is carried by the movable checking member 80 while duplicate unit 201 is mounted on the support plate 120 for the fixed checking member 81. Generally speaking, the units 200 and 201 are similarly mounted so that the supporting structure for one unit will be equally applicable to the other unit. Thus, the case 205 of transducer unit 200 is supported in a bracket 206 by lock-nut 207. The, or each, bracket 206 is formed by a pair of spaced, substantially rectangular plates 208 and 209 that are integrally united by vertically spaced, parallel rods 210. Outwardly of the rods 210, the plate 208 is formed with holes 211 that are adapted to receive a support rod of a pair of rods 212 or 213 respectively. In the case of unit 200, the rods 212 are secured in parallel, vertically spaced relation to and on opposite sides of an opening 214 provided in the support plate 99; the plate 105 of the checking member 80 having a registering opening 215. The plate 208 is adapted to be adjustably secured by screws 216 or shifted along the pair of related rods 212 with the bracket 206 moving through the matched openings 214 and 215. The purpose for this shifting movement is to locate the tip 217 of the transducer unit in a plane at a predetermined parallel distance outwardly from a reference plane taken vertically across the form surface 130.

The bracket 206 for transducer unit 201 is similarly passed through registering openings 220 and 221 in the support plate 120 and plate 115 of the checking member 81 respectively. The plate 208 of this bracket 206 is adjustably mounted on the pair of rods 213 to locate the tip 222 at substantially the same spaced distance with reference to the form surface 131. In either event, the bracket 206 of unit 201 is secured in position on the respective pair of rods 213 by set-screws 223.

In setting up the dimensional distances of movement to be traversed by the axially slidable tips 217 and 222 and with the form surfaces 130 and 131 substantially in contact, the tips are brought into contact so that the calibration of an indicator associated with the transducer units 200 and 201 will be at "zero." Therefore, when the form surfaces are spaced apart by the location of a satisfactorily bent sheet of more or less standard thickness therebetween, the tips will be equally moved to produce an electrically balanced condition of a related electric circuit. On the other hand, when the curvature of a bent sheet deviates from the predetermined contour to which the surfaces 130 and 131 are formed, the tips will be shifted to unbalance the related electric circuit. Stated otherwise, the spaced relation between the surfaces 130 and 131 can be interpreted as indicating that the glass sheet is either underbent or overbent and consequently is "off-form."

The gate 42 in the discharge station G is adapted to be radially swung from alignment with the entry and exit sections 225 and 226 respectively of the support rail 39. For this purpose, the gate 42, in the form of a wood bar or rail, is attached by a clip 227 to the upper end of a vertically disposed shaft 228. As viewed in FIGS. 2 and 4, the shaft is journaled in a bracket 229 secured to the bar section 225 and "seated" in a bearing bracket 230 at its lower end. By means of a fixed lever 231, the shaft 228 is functionally associated with the rod 232 of piston 233 in cylinder 234. The cylinder is mounted for swinging motion on a base 235 which is supported on a plate 236 carried by the channels 21–22 of framework 20. Accordingly when the cylinder is connected to one side of a related solenoid valve, later to be described, in response to functioning of the linear dimensional transducer unit 185, the gate 42 will be swung from the full line position as in FIG. 2 to an open position as is indicated in broken line.

Figure 10:
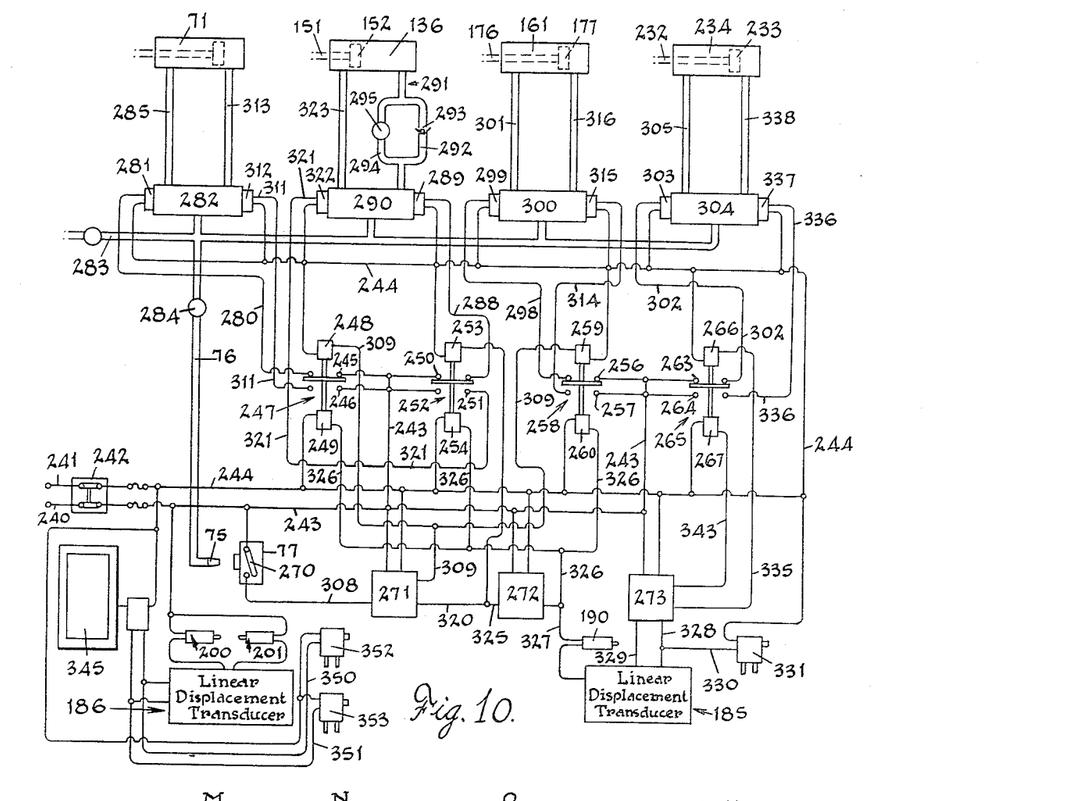
FIG. 10 is a diagrammatic view of the control system.

A representative circuitry for causing automatic operation of the inspection apparatus A is diagrammatically illustrated in FIG. 10. As herein provided, electrical supply lines 240 and 241 are completed through control switch 242 to source lines 243 and 244. Source line 243 is connected to one side of pairs of contacts 245 and 246 of a relay switch 247 having opposed solenoids 248 and 249; to one side of pairs of contacts 250 and 251 of a relay switch 252 having opposed solenoids 253 and 254; to one side of pairs of contacts 256 and 257 of relay switch 258 having opposed solenoids 259 and 260; and to one side of pairs of contacts 263 and 264 of a relay switch 265 having opposed solenoids 266 and 267. Source line 243 is likewise connected to one side of the contacts 270 of the air pressure responsive device 77 and the lineal dimensional transducer unit 186 as well as several timer relays designated at 271, 272 and 273.

As presently employed, the engaged contacts 245 of relay switch 247 complete a circuit from source line 243 by line 280 through side 281 of a solenoid valve 282 to source line 244. Valve 282 is connected to a source of air under pressure through pipe 283 which through hand valve 284 is also connected by pipe 76 to air jet nozzle 75. Valve 282 thus directs pressure through conduit 285 to the rod end of cylinder 71 whereby the stop-bar 70 is in the raised or open position with respect to the receiving station B. At this idle interval in the operation of checking member 80, the engaged contacts 250 of relay switch 252 will complete a circuit from source line 243 by line 288 through side 289 of solenoid valve 290 to source line 244. Valve 290 is adapted to presently direct air under pressure from supply pipe 283 through pipe 291 to the head end of cylinder 136 to maintain the checking member 80 in the open position by pressure of the block 153 on the carriage 101. As herein disclosed, pipe 291 has a direct pressure side 292 through one-way valve 293 and an exhaust side 294 containing a restriction valve 295.

The engaged contacts 256 of relay switch 258 are adapted to provide a circuit from source line 243 by line 298 through side 299 of solenoid valve 300 to source line 244. Valve 300, connected to supply pipe 283, directs pressure by pipe 301 to the rod end of cylinder 161 thereby acting to maintain the stop-bar 72 in its raised position at the exit end of the inspection station C. Similarly, engaged contacts 263 complete a circuit from source line 243 by line 302 through side 303 of solenoid valve 304 to source line 244. This valve from supply pipe 283 directs pressure through pipe 305 to the rod end of cylinder 234 thereby causing the gate 42 to be located in its closed position of alignment to complete the continuity of the sections of the support rail 39.

Now, when a bent sheet S passes between the nozzle 75 and switch device 77 so as to interrupt the stream P of air, the device is responsively activated to engage the contacts 270 and complete a circuit by line 308 to timing relay 271. This unit then initially establishes a circuit by line 309 through the solenoid 248 of relay switch 247 and solenoid 259 of relay switch 258 to source line 244. This action serves to disengage contacts 245 and 256 of the respective switches and to engage the pairs of contacts 246 and 257 thereof. In the first instance, contacts 246 complete a circuit from source line 243 by line 311 through side 312 of valve 282 to source line 244. This produces reversal of the valve to connect supply pipe 283 through pipe 313 to the head end of cylinder 71 and cause the stop-bar 70 to be lowered relative to the track 32. At the same time, contacts 257 establish a circuit from source line 243 by line 314 through side 315 of solenoid valve 300 to source line 244. This reverses valve 300 to connect supply pipe 283 by pipe 316 to the head end of cylinder 161 whereby the stop-bar 72 will be lowered in position to interrupt further movement of the immediate glass sheet as it leaves the area of the signal device F. More particularly, the stop-bar 72 is engaged by the leading edge or corner of the bent sheet when it is in proper registry with the form surface 131 of the fixed checking member 81. It is believed understandable that while the stop-bar 70 is described as being lowered and raised substantially simultaneously with like motions of the stop-bar 72, control for the motions of the stop-bar 70 can be modified if desired to operate the bar at different timed intervals.

Figure 11:
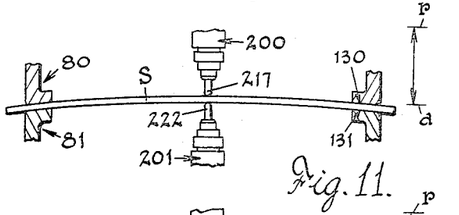
FIGS. 11, 12 and 13 are views illustrating various positions of spacing between the checking members of the apparatus.

The lapse of the time interval for which relay 271 is adjusted terminates substantially simultaneously with or following engagement of the sheet by the stop-bar and then establishes a circuit by line 320 through solenoid 253 of relay switch 252 to source line 244 thereby disengaging contacts 250 and engaging contacts 251. This pair of contacts creates a circuit from source line 243 by line 321 through side 322 of solenoid valve 290 to source line 244. This reverses valve 290 to direct air under pressure from supply pipe 283 through pipe 323 to the rod end of cylinder 136. As piston 152 moves the rod 151 thereof inwardly, the block 153 regulates the contracting capacity of the spring 135 to move the carriage 101 forward to bring the checking member 80 into contact with the surface of the glass sheet to be inspected. The rate of this movement can of course be varied by use of the valve 295 in section 294 of pipe 291 which is then in exhaust. When contact of the form surface 130 with the adjacent glass surface has been initially made, the block 153 is moved away from the carriage bar 100 whereupon the spring acts independently to positively carry out the inspection operation. At this time also, the bar 100 is brought into contact with the tip 196 of the linear dimension transducer unit 190. Now, if the curvature of the bent sheet S conforms to the contoured surfaces 130 and 131 of the checking members, the relation of the glass and members will be as graphically shown in FIG. 11, in connection with the reference distance between lines r and a. With regard to FIG. 8, the bar 100 will have moved forwardly from reference line r to a position coinciding with reference line a.

By branch 325, line 320 is also connected to timer relay 272 such that when the circuit through line 320 is established by timer relay 271, the circuit by line 325 will activate the relay 272 to monitor a time interval for the inspection operation to be effected and to then establish a circuit by line 326 through a solenoids 249, 254 and 260 to source line 244. Solenoid 249 of relay switch 247 reverses the same to disengage contacts 246 and re-engage contacts 245. This operates to re-establish the circuit of line 280 to valve 383 whereupon the cylinder 71 will act to raise the stop-bar 70 thereby releasing a bent sheet S for movement from the receiving station B along the conveyor E.

Solenoid 254 reverses relay switch 252 to re-engage contacts 250 while disengaging contacts 251. This will restore the circuit of line 288 through the side 289 of valve 290 to source line 244. The valve is thereupon reversed to again direct pressure by pipe 291 to the head end of cylinder 161 with the resultant rearward movement of the checking member 80 to the open position. Likewise, solenoid 260 reverses relay switch 258 to disengage contacts 257 and restore the circuit through contacts 256. This will cause valve 300 to again direct pressure through pipe 301 to the rod end of cylinder 161 whereupon the stop-bar 72 will be swung upwardly from the path of sheet movement. Thus, with the stop-bar 72 in the raised position, as the checking member 80 is retracted toward its open position the bent glass sheet will be permitted to move forwardly with the conveyor belt 30 until it is located in the station D from which area it can be removed.

However, when the circuit of line 326 is made, a circuit through line 327 is established simultaneously to one side of the unit 190 associated with the linear displacement transducer 185. Consequently the position of the tip 196 to the circuitry of the unit 190 will be translated voltagewise to the unit 185 which will or will not activate the timer relay 273; being connected thereto by circuit lines 328 and 329. Thus when the carriage bar 100 has depressed the tip 196 to a position indicated by the reference line $a$ of FIG. 8, the control through unit 190 and transducer 185 will not activate the timer relay 273 and in consequence influence the position of the gate 42. In other words, a balanced voltage condition will be maintained in the transducer 185.

In the event that, although the glass sheet has been properly bent, the sheet is determined by the spaced distance between the form surfaces 130 and 131 to be under the predetermined tolerance for thickness of the glass sheet, it will be selectively separated from the conveyor E before reaching the removing station D. To illustrate, with reference to FIG. 8, if, because a sheet is too thin, the bar 100 has depressed the tip 196 sufficiently to locate the same at a point coinciding with reference line $u$, an unbalance condition will be produced in the transducer 185 that will conplete a circuit by line 328 to the timer relay 273 and by branch 330 to a spray gun unit 331.

The relay 273 is adjusted to monitor a time interval during which the immediate glass sheet will be carried from the inspection station C into the area of the discharge station G thus initially opening the gate 42 and subsequently closing the same. To this end, the relay establishes a circuit by line 335 through the solenoid 266 of relay switch 265 to source line 244. This operates to disengage contacts 263 while engaging contacts 264 to complete a circuit from source 243 by line 336 through the side 337 of valve 304 to source line 244. The valve reverses to connect supply pipe 283 through pipe 338 to the head end of cylinder 234 thereby causing piston rod 232 to swing the gate 42 to an open position as indicated in broken line in FIG. 2. This is produced by pivotal movement of the lever 231 to turn the shaft 228 attached to the gate.

When a bent sheet is thus discharged from the conveyor line E, it is received on an angularly disposed tray 340 (FIG. 2) and permitted to slide onto a receiving element, such as a belt conveyor 341, for reasons to be hereinafter more fully described.

During this course of events, the spray gun 331 is adapted to direct a small stream of water-soluble dye onto one surface of the sheet. Accordingly, when the transducer is rendered effective to activate the timer relay 273, the spray gun will apply a spot of color, such as yellow, as the thin, bent sheet is carried from the inspecting station C.

When the relay 273 "times" out, it causes opening of line 335 and re-establishment of the circuit by line 343 through solenoid 267 of relay switch 265 to source line 244. This operates to disengage contacts 264 and re-engage contacts 263 whereby the circuit of line 302 to the side 303 of valve 304 will be restored. Valve 304 thus connects supply pipe 283 by pipe 305 to the rod end of cylinder 234 causing the same to swing the gate 42 to the closed position between rail sections 225 and 226.

Figure 12:
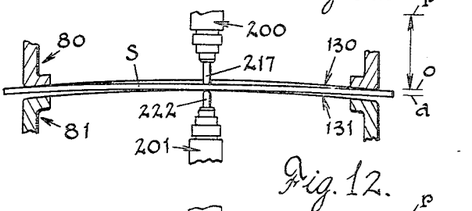
Figure 13:
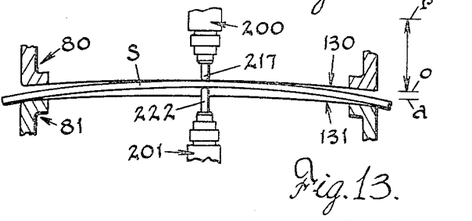

Referring now to FIGS. 12 and 13, there are illustrated two "off-form" conditions wherein the finalized curvature of glass sheet is typical of glass sheets either "under" bent as in FIG. 12, or "over" bent as in FIG. 13. It will be appreciated that the magnitude of deviation as illustrated in these figures is only by way of example since the non-conformity of the glass sheet may only be within a range of plus or minus 0.030″ (thirty thousandths of an inch). However, as shown in FIG. 12, the underbent condition of a glass sheet causes the marginal areas of the surface 130 to contact the end areas of the sheet while the central areas of the sheet and the surface 131 are in contact. On the other hand, an overbent condition of the sheet as shown in FIG. 13 causes the end areas of a sheet to contact the marginal areas of surface 131 while the central areas of the sheet and surface 130 are in contact.

In either of these situations, as pointed out above, the bar 100 will only depress the tip 196 between the reference lines $o$ and $a$. The transducer 185 will then be reacted to cause opening of the gate 42 to discharge the sheet bent to a curvature not conforming with the form surfaces of the checking members. Also, as the checking member 80 is moved into contact with the glass sheet as in FIG. 12, the tip 217 will remain extended while the tip 222 is depressed to produce an unbalanced condition in the unit 186 with a resulting linear record being made on the chart 345 of the deviation of curvature in the sheet. In FIG. 13, a reverse circumstance of overbending causes the tip 222 to remain extended and the tip 217 to be depressed with an oppositely acting unbalanced condition to exist in the transducer unit 186 which is likewise indicated on the chart 345.

It will be realized that certain bent sheets will be within an acceptable tolerance even though they exhibit some deviation. Other bent sheets, however, will not be within such tolerance and must be discarded. Sheets of this type are discharged from the conveyor upon movement of the gate 42 to its open position and, as herein contemplated, acceptable sheets on the conveyor 341 can be removed in separated groups without further inspection to locate the "off-form" bent sheets that are within the tolerance limits. Thus, the unit 186 is connected by circuit lines 350 and 351 to spray guns 352 and 353. If the curvature of an underbent or overbent glass sheet is within the predetermined tolerance, the gun 352 will direct a small stream of water-soluble dye onto the surface of the sheet, such as a green spot. Should the curvature of the bent sheet be over the limits of tolerance, the spray 353 will be operated to direct a small stream of a water-soluble dye, as of red, on the surface of the sheet in the same manner.

As above pointed out, when a circuit by line 327 is completed to the unit 190, the circuitry of the unit will become effective through the transducer 185 to establish a circuit to the timer relay 273 which controls opening and closing of the gate 42. The circuit of line 328 has already been described in connection with the movement of tip 196 to a position diagrammatically indicated by the letter *u* when the bent sheet is too thin. On the other hand, when a bent sheet does not conform to the surfaces 130 and 131, the tip will be located within the distance defined by the lines *o* and *a*. In this event when the circuit of line 327 is effective through the unit 190, the unbalance condition in the transducer 185 will establish a circuit by line 329 to timer relay 273 to cause opening of the gate 42 in the same manner as above described. Accordingly, when either of the guns 352 or 353 are activated by the transducer unit 186 to indicate that "off-form" bent sheets are either over or under the tolerance of deviation, the unit 185 will simultaneously become active to cause opening of the gate 42 during functioning of the relay 273. The bent sheets thus designated by a green spot of color or a red spot will be discharged from the conveyor 30 and received on the tray 340.

Consequently in accordance with this invention, a plurality of bent glass sheets can be successively inspected in a substantially automatic manner and then selectively separated into a group containing bent sheets having a curvature conforming to a predetermined contour, a group having spots of green to indicate "off-form" bent sheets within or below a predetermined tolerance of deviation, a group having spots of red to indicate "off-form" bent sheets over the predetermined tolerance and lastly a group identified by a yellow spot to denote that the bent sheets are not within a predetermined tolerance of thickness.

While the embodiments of this invention have been discussed with an inspection apparatus on which bent sheets of glass are manually loaded at a receiving station and then automatically passed through an inspection station, it is realized that the location of such inspection apparatus at the end of glass treating production equipment would provide several advantages. As shown in FIG. 14, such treating apparatus could include a horizontal conveyor system L adapted to carry glass sheets through a heating furnace M, a bending apparatus N and a cooling or tempering apparatus O. At the end of the apparatus O, the bent sheets of glass will be received at the entry station B of the inspection apparatus A. Consequently, the occurrence of glass sheets that are underbent or overbent will be immediately called to the operators attention whereby corrective measures can be made to overcome such defects.

In fact, it is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. In an apparatus for inspecting sheets, a pair of aligned checking members having facing surfaces complementary to the surface contours desired on opposite sides of a sheet to be inspected, means for locating said sheet between said surfaces, means for creating relative movement between said members and to resiliently urge one of said facing surfaces toward the other, and means actuated when said movement is less than a predetermined distance to indicate a lack of conformity between a surface of said sheet and the complementary facing surface on one of said members, said indication including the application of a selected color to an area of said sheet.

2. In an apparatus for inspecting sheets, a pair of aligned checking members having facing surfaces complementary to the surface contours desired on opposite sides of a sheet to be inspected, means for locating said sheet between said surfaces, means for creating relative movement between said members and to resiliently urge one of said facing surfaces toward the other and means actuated when said movement exceeds a predetermined distance to indicate that said sheet is below a required thickness tolerance.

3. In apparatus for inspecting sheets, means for conveying substantially vertically arranged sheets along a predetermined path, a checking member positioned on one side of said path and having a surface facing said path complementary to the surface contour desired on one side of a sheet to be inspected, a second checking member on the opposite side of said path facing the same and having a surface complementary to the surface desired on the opposite side of said sheet, means for temporarily interrupting movement of a sheet along said path and for locating it between said facing surfaces, means for resiliently urging the surface of one of said checking members toward the surface of the other, and means operable by movement of said one checking member short of a predetermined point to indicate deviation between the surface contour on either side of said sheet from the surface contour of its adjacent checking member.

4. Inspection apparatus as defined in claim 3 in which said indicating means includes means for directing sheets that exhibit excessive surface contour deviation out of said predetermined path after they leave said checking members.

5. Inspection apparatus as defined in claim 3 in which there is also provided means actuated by said sheet to apply a selected color to an area of said sheet in accordance with the magnitude of said deviation.

6. An inspection apparatus as defined in claim 3 in which there is also provided means operable by movement of said one checking member beyond a predetermined point to indicate that said sheet is below a required thickness by applying a selected color thereto.

7. In apparatus for inspecting sheets, a horizontal conveyor for supporting said sheets on edge and moving the same along a predetermined path, means associated with said conveyor for maintaining sheets moving thereon in substantially vertical position, a checking member fixedly mounted on one side of said conveyor and having a surface facing the same complementary to the surface contour desired on one side of said sheets, a second checking member mounted on the opposite side of said conveyor in alignment with said fixed member for movement toward and away therefrom and having a surface facing said surface on said fixed member complementary to the surface contour desired on the opposite side of said sheets, means for temporarily interrupting movement of a sheet on said conveyor and for locating the same between the facing surfaces of said members, means for resiliently urging said movable member toward said fixed member when a sheet is located therebetween, and means operable by the extent of movement of said movable member to indicate lack of conformity between said surfaces on said members and the surfaces of said sheet.

8. An inspection apparatus as defined in claim 7 in which there is also provided means operable by changes in the contour of a sheet located between said surfaces to indicate the magnitude of any lack of conformity between said surfaces on said members and the surfaces of said sheet, and in which said indications include actuation of means for directing said sheet from said conveyor during continued movement thereof after leaving said checking member if the magnitude of deviation exceeds a predetermined tolerance.

9. An inspection apparatus as defined in claim 8 in which said indications include the application of a color selected in accordance with the magnitude of nonconformity between the surfaces on said members and the surfaces of said sheet.

10. An inspection apparatus as defined in claim 7 in which means is provided for controlling the speed with which said movable member is resiliently urged toward said fixed member.

11. An inspection apparatus as defined in claim 7 in which there is also provided means operable by changes in the contour of a sheet located between said surfaces to indicate the magnitude of any lack of conformity between said surfaces on said members and the surfaces of said sheet, said last named means including an electrically responsive member having a freely moving sensing tip carried by the fixed checking member, a second electrically responsive member having a freely moving sensing tip carried by the movable checking member, a balanced electrical circuit controlled by the first and second electrically operated members, and gaging means associated with said electrical circuit to indicate the direction and extent of deviation from conformity between said surfaces on said members and the surfaces of said sheet.

References Cited by the Examiner

UNITED STATES PATENTS

| 2,219,155 | 10/1940 | Wilcox | 209—88 |
| 2,852,852 | 9/1958 | Byrkett et al. | 33—174 |
| 2,977,533 | 3/1961 | Savage | 324—71 |
| 3,080,659 | 3/1963 | Wolford | 209—88 X |

M. HENSON WOOD, JR., *Primary Examiner.*

A. N. KNOWLES, *Assistant Examiner.*